United States Patent [19]

Murakami et al.

[11] 3,836,707

[45] Sept. 17, 1974

[54] VIDEO SIGNAL PROCESSING DEVICE FOR EXTRACTING THE CHROMINANCE AND LUMINANCE SIGNALS FROM A COMPOSITE VIDEO SIGNAL IN A COLOR TELEVISION RECEIVER

[75] Inventors: Toshio Murakami; Akira Shibata, both of Yokohama, Japan

[73] Assignee: Hitachi, Ltd., Tokyo, Japan

[22] Filed: Dec. 27, 1972

[21] Appl. No.: 318,987

[30] Foreign Application Priority Data

| | | |
|---|---|---|
| Feb. 4, 1972 | Japan | 47-12221 |
| Feb. 4, 1972 | Japan | 47-12225 |
| Dec. 27, 1971 | Japan | 46-105307 |

[52] U.S. Cl. ........ 178/5.4 R, 178/DIG. 25

[51] Int. Cl. ........ H04n 5/38

[58] Field of Search ..... 178/5.4 R, 5.4 ST, DIG. 12, 178/DIG. 25, DIG. 34

[56] References Cited

UNITED STATES PATENTS

| | | | |
|---|---|---|---|
| 2,971,053 | 2/1961 | Gibson | 178/DIG. 25 |
| 3,643,011 | 2/1972 | Engel | 178/DIG. 25 |
| 3,743,766 | 7/1973 | Loose | 178/5.4 R |

*Primary Examiner*—Albert J. Mayer
*Attorney, Agent, or Firm*—Craig & Antonelli

[57] ABSTRACT

A video signal processing device for a color television receiver includes a low-pass filter for obtaining lower frequency components out of a composite video signal consisting of a luminance signal and a carrier chrominance signal, a band-pass filter for obtaining higher frequency components of the composite video signal, and a signal wave processing unit for delivering the second order differential of the composite video signal. There is provided in the device a first comb-shaped filter and a second comb-shaped filter for obtaining carrier chrominance signal components and luminance signal components from the outputs of the band-pass filter and the signal wave processing unit, respectively, and an adder for adding the luminance signal components extracted from the output of the signal wave processing unit by means of the second comb-shaped filter to the output obtained from the low-pass filter, whereby a low noise luminance signal added with a preshoot and an overshoot can be obtained from the adder, and a carrier chrominance signal also of low noise can be obtained from the first comb-shaped filter. Alternate embodiments are also simplified by the fact that only a single comb-shaped filter is required.

25 Claims, 23 Drawing Figures

VIDEO SIGNAL PROCESSING DEVICE FOR EXTRACTING THE CHROMINANCE AND LUMINANCE SIGNALS FROM A COMPOSITE VIDEO SIGNAL IN A COLOR TELEVISION RECEIVER

BACKGROUND OF THE INVENTION

1. Field of the Invention

This invention relates to a video signal processing device to be used in a color television receiver for obtaining a carrier chrominance signal and a luminance signal from a composite video signal which is obtained through video signal detection in the receiver. More specifically, the invention relates to a video signal processing device for obtaining the luminance signal and the carrier chrominance signal included in a high-frequency range of the luminance signal in an interleaving relationship, separately out of the composite video signal, with both signals being obtained at low noise conditions.

2. Description of the Prior Art

As is well known in the art, the video signal obtained in a color television receiver comprises a luminance signal and a carrier chrominance signal (hereinafter referred to as a chrominance signal) included in an interleaved relationship in a higher frequency range of the luminance signal, that is, in a range of approximately 3.58 MHz ± 500 KHz. Furthermore, the component frequencies of the luminance signal are concentrated near a horizontal scanning frequency $f_H$ and the higher harmonics $n f_H$, whereas the component frequencies of the chrominance signal are concentrated in odd-multiples of $\frac{1}{2} f_H$, that is, $(n + \frac{1}{2}) f_H$. For extracting the chrominance signal from the composite video signal, a band-pass filter of 3.5 MHz ± 500 KHz is ordinarily used. On the other hand, for extracting the luminance signal out of the composite video signal, a trap circuit for suppressing the chrominance signal and/or a higher range suppressing circuit for attenuating the chrominance signal distributing high frequency band are used.

However, in such conventional systems, the separation between the luminance signal and the chrominance signal has not been sufficient, and "dot" interference has been caused because of mixing of the chrominance signal in the high-frequency portion of the luminance signal, or "cross color" interference has been caused because of mixing of a high-frequency portion of the luminance signal in the chrominance signal.

Furthermore, the luminance signal thus obtained tends to be attenuated in its high-frequency range of about 3.58 MHz ± 500 KHz, thus causing deterioration in the resolution and obscurity of the image. Such a disadvantage has been prevented by applying the output obtained from a carrier signal suppressing circuit to a variable response circuit comprising a capacitor, a resistor, and an inductance element for varying the response in a comparatively low frequency range (for instance, from 1 to 2 MHz) of the luminance signal, whereby a preshoot and an overshoot are provided on the luminance signal for improving the quality of the image.

The above-described variable response circuit, however, can vary the response only in a comparatively low-frequency range, and hence cannot render a narrow preshoot and a narrow overshoot on the luminance signal, which include high-frequency portions for improving the sharpness of the image. In the above-described variable response circuit, when it is attempted to vary the response in a comparatively high-frequency range, such as from 3 to 4 MHz for the purpose of obtaining a higher resolution, the above-described "dot" interference appears in the image. In addition, along with the exaggeration of the high-frequency range, white noise is also enhanced, thus deteriorating the image.

SUMMARY OF THE INVENTION

Therefore, a principal object of the present invention is to provide a video signal processing device wherein mixing of the chrominance signal in the high-frequency portion of the luminance signal can be prevented thereby to reduce or eliminate "dot" interference, and also mixing of the luminance signal in the chrominance signal can be prevented thereby to substantially reduce or eliminate "cross color" interference.

An additional object of the invention is to provide a video signal processing device wherein a narrow preshoot and a narrow overshoot including high-frequency components for improving the sharpness of image can be applied onto the luminance signal, and the quality of the image can be thereby substantially improved.

Aforementioned and other objects of the present invention can be achieved by a video signal processing device according to the present invention which is characterized by filters having comb-shaped attenuation characteristics used for passing the chrominance signal and the luminance signal, respectively.

Another feature of the present invention resides in a video signal processing device wherein means for processing the signal wave is provided, and the composite video signal after being processed in the processing means is applied to one of the filters having comb-shaped attenuation characteristics (hereinafter referred to as comb-shaped filters), the output being utilized for correcting the waveform of the luminance signal.

Still another feature of the invention is in the provision of a video signal processing device wherein a signal comb-shaped filter is commonly used for passing the chrominance signal and the luminance signal for the simplification of the construction.

The other objects, features, and advantages of the present invention will be apparent from the following detailed description when read in conjunction with the accompanying drawings.

DESCRIPTION OF THE PREFERRED EMBODIMENTS

Figure 1:
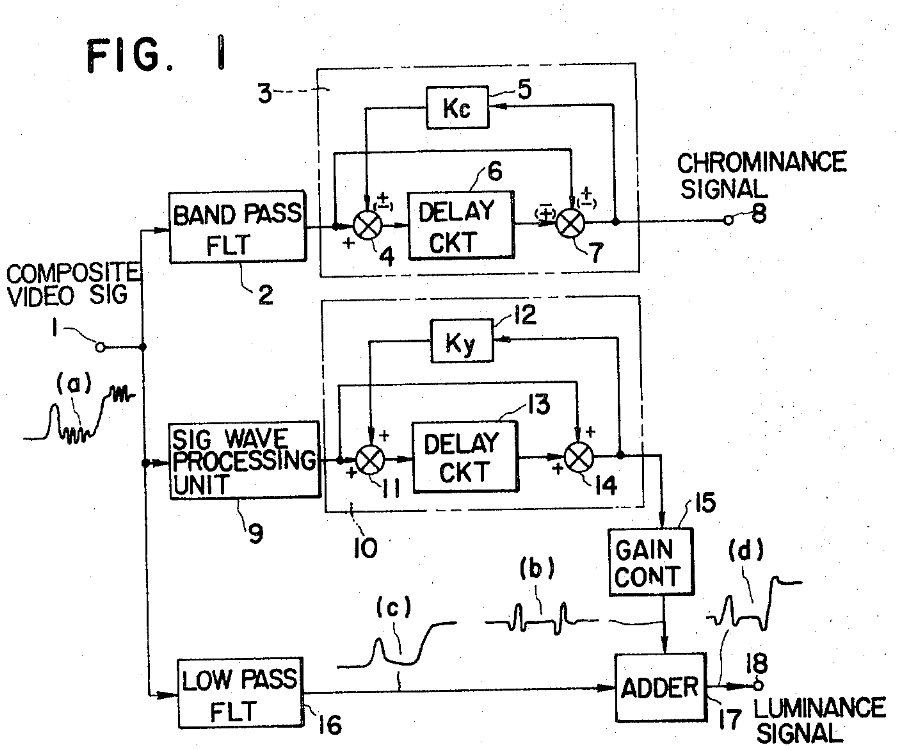
FIG. 1 is a schematic block diagram showing an example of the video signal processing device which constitutes a preferred embodiment of the present invention.
Figure 2A:
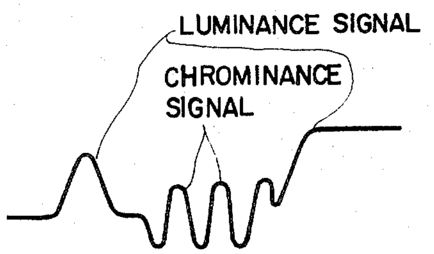
FIGS. 2(*a*), 2(*b*), 2(*c*), and 2(*d*) are waveform diagrams showing waveforms obtained in various parts of the video signal processing device of FIG. 1.
Figure 2B:
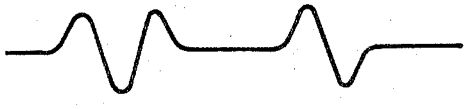
Figure 2C:
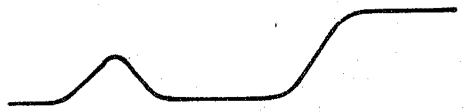
Figure 2D:
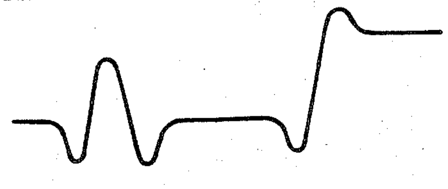

In FIG. 1 showing an embodiment of the present invention, a composite video signal applied to an input terminal 1 of the video signal processing device is thereafter supplied simultaneously to a band-pass filter 2 of, for instance, 3.58 MHz ± 500 KHz, a signal wave processing unit 9 consisting of, for instance, a second order differentiating circuit, a high-pass filter, and others, which is employed for obtaining a waveform correcting signal for applying a preshoot and overshoot on the luminance signal, and a low-pass filter 16 of, for instance, a cut-off frequency of 2 MHz.

By means of the band-pass filter 2, a frequency portion wherein the chrominance signal is distributed, is extracted. Within this extracted frequency portion, a high-frequency part of the luminance signal is also contained. However, the high-frequency part of the luminance signal is removed when the extracted frequency portion is thereafter passed through a comb-shaped filter 3. The comb-shaped filter 3 comprises a delay circuit 6 having a delay time corresponding to one horizontal scanning period, a feedback circuit 5 having a feedback ratio Kc, an adder 4 (also operable as a subtractor), and another subtractor 7. Thus, when the frequency portion is passed through the comb-shaped filter 3, a signal component passed through the delay circuit 6 and another signal component not passed through the delay circuit 6 are subtracted at the indicated signs in the subtractor 7, whereby the frequency components near $(n + ½)\ f_H$ wherein the frequencies of the chrominance signal are concentrated, are canceled out for exhibiting a comb-shaped filter characteristic. The comb-shaped filter 3 will be hereinafter described in more detail.

On the other hand, the waveform correcting signal is obtained from the signal wave processing unit 9 wherein comparatively higher frequency part of the video signal is processed. For this reason, the waveform correcting signal includes a part of the chrominance signal. This chrominance signal part is removed from the waveform correcting signal when the latter signal is thereafter passed through another comb-shaped filter 10, and a good second-order differentiated waveform correcting signal can be obtained. This waveform correcting signal is thereafter passed through a gain controller 15 for adjusting the output level, and the thus controlled output of the gain controller 15 is then applied to an adder 17 (also operable as a subtractor depending on the polarity of the waveform correcting signal) together with the dull-shaped luminance signal obtained from the low-pass filter 16 of, for instance, a cut-off frequency of 2 MHz and an attenuation against the chrominance signal of lower than 20 dB, to which the video signal is applied as described before. When these signals are added together or subtracted therebetween in the adder 17, a luminance signal suitably added with a preshoot and an overshoot can be obtained from the output terminal 18. With the aforedescribed construction, an image quality adjusting device for a television receiver can be produced utilizing the output from the terminal 18, wherein the image can be regulated from soft to sharp by adjusting the output of the gain controller 15.

The comb-shaped filter 10 is also constructed from a delaying circuit 13 having a delay time corresponding to one horizontal scanning period, a feedback circuit 12 having a feedback ratio of $K_y$, and adders 11 and 14. A signal passed through the delay circuit 13 and another signal not passed through the delay circuit 13 are added in the adder 14, whereby the frequency components near $n\ f_H$, wherein frequencies of the luminance signal are concentrated, can be canceled between each other for exhibiting a comb-shaped attenuation characteristic, and the comb-shaped characteristic can be varied by adjusting the feedback ratio to a suitable value. The comb-shaped filter 10 will be more closely described hereinafter.

In the above-described construction, even if the gain of the waveform correcting signal is elevated for obtaining a sharp image through the adjustment of the gain controller 15, any possibility of causing "dot" interference is now eliminated. Furthermore, since the white noise in a frequency range wherein the chrominance signal exists, in other words, interleaved noise is suppressed by means of the comb-shaped filter 10, there is no possibility of appearance of the white noise in the picture even if the high-frequency range of the chrominance signal is emphasized through the adjustment of the gain controller 15.

In FIGS. 2(*a*) through 2(*d*), waveforms of signals obtained at various parts in the device shown in FIG. 1 are indicated. Thus, when a composite video signal shown in FIG. 2(*a*), which is applied to the input terminal 1, is passed through the signal wave processing unit 9, such as a second-order differentiating circuit, and the comb-shaped filter 10 for passing the luminance signal, the output signal from the comb-shaped filter 10 is formed into the waveform correcting signal as shown in FIG. 2(*b*), in which the chrominance signal is suppressed and to which the preshoot and the overshoot are thereafter added. On the other hand, when the composite video signal shown in FIG. 2(*a*) is passed through the low-pass filter 16, the output signal obtained thereof is a dull-shaped luminance signal as shown in FIG. 2(*c*). Although the mere employment of the signal of FIG. 2(*c*) as the luminance signal would cause a dull picture on the receiver, a good luminance signal as shown in FIG. 2(*d*) having a preshoot and an overshoot can be obtained by the addition of the waveform correcting signal shown in FIG. 2(*b*) to the signal shown in FIG. 2(*c*) with the polarity of the former signal being reversed.

Figure 3A:
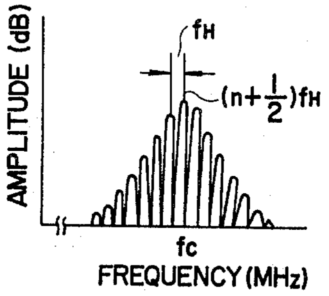
FIGS. 3(*a*) and 3(*b*) are diagrams showing frequency characteristics of the chrominance signal and luminance signal obtained from the video signal processing device according to the present invention.
Figure 3B:
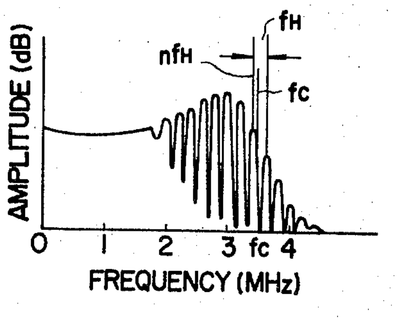

In FIG. 3(A), there is indicated a frequency characteristic of the chrominance signal delivered from the terminal 8 in the video signal processing device shown in FIG. 1. As will be apparent from the characteristic, only those portions where frequencies of the chrominance signal are distributed are emphasized therein. On the other hand, FIG. 3(B) indicates a frequency characteristic of the luminance signal obtained from the terminal 18 of the same device. In this characteristic, it will be apparent that the portions wherein the frequencies of the chrominance signal are distributed in the high-frequency part of the luminance signal are suppressed, and the portions wherein the frequencies of the luminance signal are distributed are emphasized. In these frequency characteristics, $f_c$ is the color subcarrier frequency.

Figure 4:
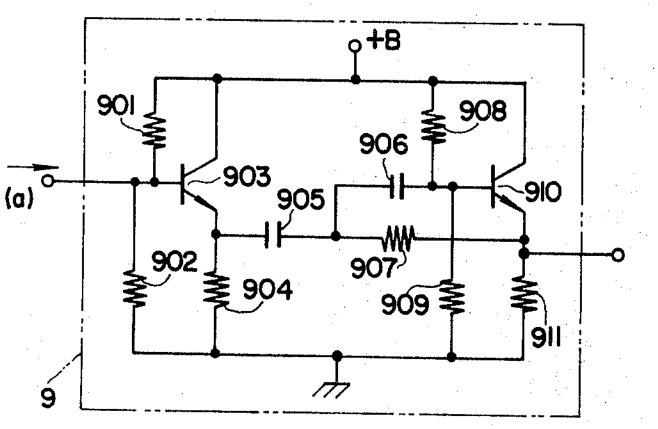
FIG. 4 is a circuit diagram showing an example of the signal wave processing unit used in the device according to this invention.

In FIG. 4, there is indicated a signal wave processing unit formed into a second order differentiating circuit which is employed for obtaining the signal shown in FIG. 2(*b*) from the video signal shown in FIG. 2(*a*). The differentiating circuit comprises transistors 903 and 910, bias resistors 901, 902, 908 and 909, and emitter resistors 904 and 911. The circuit further includes capacitors 905 and 906 which, together with the resistors 907 and 908 and 909, determine the input/output transfer function of this differentiating circuit. Furthermore, by selecting the constants of the transfer function suitably, a waveform as shown in FIG. 2(*b*) having a preshoot and an overshoot symmetrically arranged therein can be obtained, and the widths of these shoots can also be selected suitably.

Figure 5A:
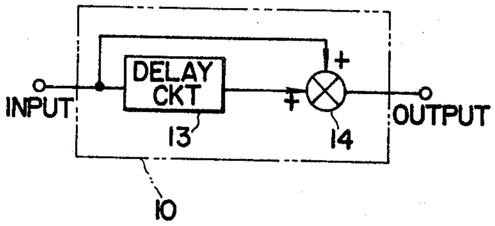
FIGS. 5(A), 6(A), 7(A), and 8(A) are block diagrams respectively showing various examples of the comb-shaped filters employed in the device according to this invention.
Figure 5B:
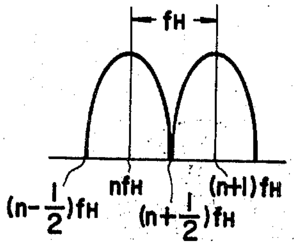
FIGS. 5(B), 6(B), 7(B), and 8(B) are diagrams showing frequency characteristics of the various comb-shaped filters, respectively.
Figure 6A:
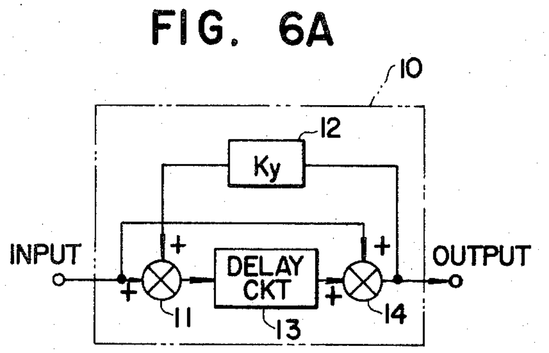

In FIGS. 5(A) and 6(A), there are indicated two examples of the comb-shaped filter 10 to pass the luminance signal. In the example shown in FIG. 5(A), a signal passing through a delay circuit 13 having a delay time equivalent to one horizontal scanning period and an original signal not passed through the delay circuit are added together in an adder 14. With this construction, this example of the comb-shaped filter possesses a comb-shaped frequency characteristic, as shown in FIG. 5(B). The other example shown in FIG. 6(A) comprises an adder 11 and a feedback circuit 12 beside of the circuit components included in the previous example shown in FIG. 5(A). With this construction, an output signal fedback through the feedback circuit 12 and the input signal are added in the adder 11, and the thus added signal is applied to the delay circuit 13. In this case, the comb-shaped frequency characteristic as shown in FIG. 6(B) of this example of the filter can be varied by varying the feedback ratio $K_y$ of the feedback circuit 12.

Assuming that the input of the latter example of the comb-shaped filter 10 is represented by $e_{in}$, the output thereof is $e_{oy}$, the feedback ratio is $K_y$ $(-1 < K_y < 1)$ and one horizontal scanning period is $T_H$, the transfer function for this filter can be expressed as $$e_{oy}/e_{in} = G\ (jw)_y = 1 + e^{-jwT_H}/1 - K_y\ e^{-jwT_H} \qquad (1)$$

Figure 6B:
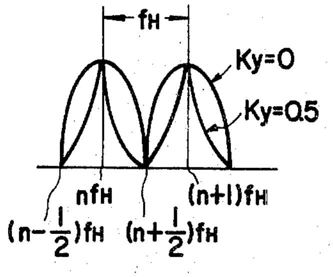

Normalizing the above equation at the maximum gain $2/1 - K_y$, a frequency characteristic as shown in FIG. 6(B) showing attenuation of infinitely large value at frequencies equaling the odd multiples of ½ $f_H$ can be obtained.

Figure 7A:
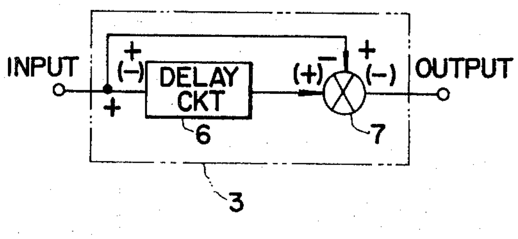
Figure 7B:
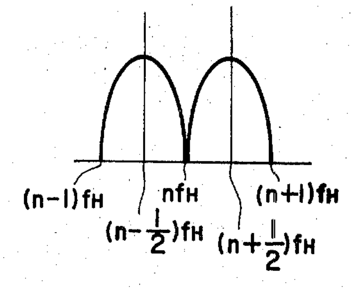
Figure 8A:
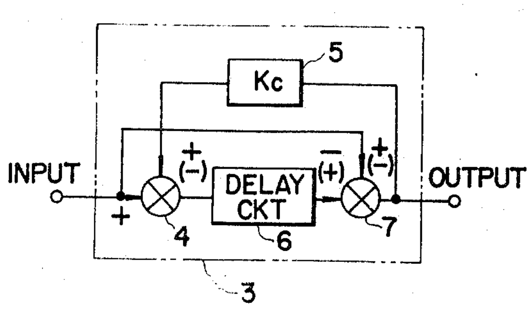

In FIGS. 7(A) and 8(A), there are indicated two examples of the comb-shaped filter 3 to pass the chrominance signal. One of the example, shown in FIG. 7(A), is so constructed that the output signal passed through a delay circuit 6 which has a delay time equivalent to one horizontal scanning period (H), and the input signal directly applied to a subtractor 7 are subtracted in the subtractor 7 one from the other. It is known that the comb-shaped filter having the above-described construction has a comb-shaped frequency characteristic including attenuation points shifted in the direction of the horizontal axis, as shown in FIG. 7(B), by ½ H compared the case of the previous example shown in FIG. 5(A).

The other example shown in FIG. 8(A) comprises an adder 4 (also operable as a subtractor) and a feedback circuit 5 beside the circuit components described with respect to the previous example shown in FIG. 7(A), and is so constructed that the output from the subtractor 7 further passed through the feedback circuit 5 and an input signal are added (or subtracted) in the adder (or subtractor) 4, and the output of the adder (or subtractor) 4 is thereafter passed through the delay circuit 6. With this construction, the comb-shaped frequency characteristic of the comb-shaped filter can be varied as shown in FIG. 8(B) by varying the feedback ratio $K_y$ of the feedback circuit 5.

The input/output transfer function of the comb-shaped filter shown in FIG. 8(A) is expressed as follows:

$$e_{oc}/e_{in} = G\ (jw)_c = 1 - e^{-jwT_H}/1 + K_c\ e^{-jwT_H} \qquad (2)$$

Figure 8B:
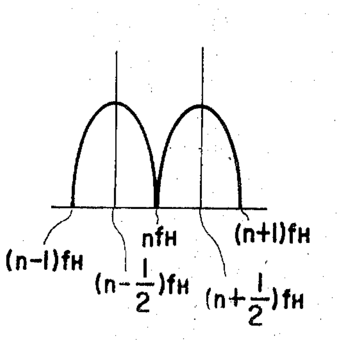

Accordingly, when this equation is normalized at the maximum gain $2/1 - K_c$, a frequency characteristic having infinitely great atteunation points at the horizontal synchronizing frequency $f_H$ and its higher harmonics, as shown in FIG. 8(B), can be obtained. It will be apparent that the S/N ratio in the color signals can be further improved by varying the frequency characteristics of the comb-shaped filters shown in FIGS. 6(A) and 8(A), as described above, thereby elevating the selectivity of these filters.

Although the quality of the picture in the television receiver can be remarkably improved by means of the video signal processing device as shown in FIG. 1, wherein comb-like filters are utilized as described above, the circuitry of the video signal processing device is comparatively complicated and of high cost because the device of FIG. 1 requires two comb-shaped filters, each including a delay circuit, for passing the chrominance signal and the luminance signal.

Figure 9:
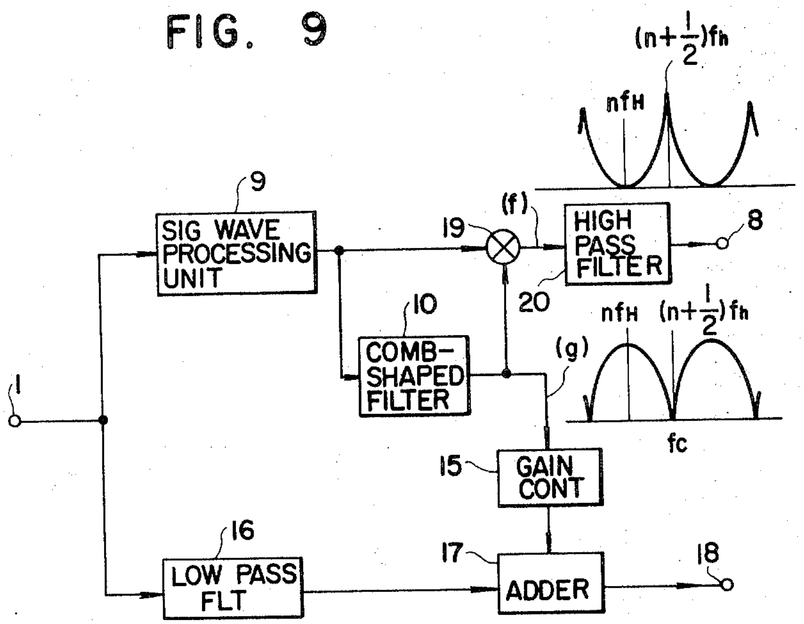
FIGS. 9, 10, 11, 12, and 13 are block diagrams showing various other embodiments of the invention.

An example shown in FIG. 9 is provided for simplifying the video signal processing device shown in FIG. 1 by utilizing a single comb-shaped filter, including a delay circuit, for providing the chrominance signal and the luminance signal without degradation of the operational features.

In the video signal processing device shown in FIG. 9, when a composite video signal which includes a chrominance signal and a luminance signal and is applied to the input terminal 1 is further applied to a signal wave processing unit (second order differentiating circuit) 9, a composite signal consisting of a chrominance signal and a waveform correcting signal which is used for producing a preshoot and an overshoot on the luminance signal can be obtained from the signal wave processing unit. This composite signal is thereafter applied to a comb-shaped filter 10, and a waveform correcting signal for the luminance signal wherein chrominance signal frequencies are suppressed is obtained. When the composite signal constituting the input signal of the comb-shaped filter 10 and the waveform correcting signal for the luminance signal constituting the output signal of the same filter 10 are applied to a subtractor 19, a chrominance signal from which the luminance signal components are removed can be obtained from the subtractor 19. By this procedure, an equivalent frequency characteristic as produced in the case where a separate comb-shaped filter is provided for passing the chrominance signal can be obtained.

One part of the frequency characteristic of the comb-shaped filter 10 is indicated in FIG. 9 at (*g*) which corresponds to the case of the comb-shaped filter in FIG. 1 being set to $K_y = 0$. Such a configuration of the output signal from the comb-shaped filter 10 causes a characteristic as shown in FIG. 9 at (*f*) in the output of the subtractor 19, which has superior selectivity than the characteristic shown in FIG. 9 at (*g*).

In the example shown in FIG. 1, the selectivities of the comb-shaped filters 3 and 10 were improved by feeding a part of the outputs back into the input thereof through feedback circuits 5 and 12 at feedback ratios of $Kc$ and $K_y$, respectively. In contrast, in the example shown in FIG. 9, even if the frequency characteristic of the output signal from the comb-shaped filter 10 is as shown in FIG. 9 at (*g*) corresponding to the feedback ratio $K_y = 0$ (this indicates that no feedback circuit is provided), the output signal from the subtractor 19 has an equivalent comb-shaped characteristic as the case of the feedback circuit being provided. Thus, the S/N ratio in the color signal can be improved without employing the feedback circuit. Of course, it is apparent that the characteristic shown in FIG. 9 at (*g*) can be varied as to the selectivity when a feedback circuit 12 is provided for the comb-shaped filter 10, and in this case, the comb-shaped characteristic shown in FIG. 9 at (*g*) is also varied in accordance with the variation in the characteristic shown in FIG. 9 at (*g*).

A circuit 20 connected to the output side of the subtractor 19 is a comparatively simple high-pass filter for compensating the characteristic of the band-pass filter employed in the chrominance signal processing circuit. By the use of a high-pass filter 20 having a cut-off frequency of about 3 MHz, the output chrominance signal from the terminal 8 will have a frequency characteristic falling within the range of about 3.58 MHz ± 500 KHz, as shown in FIG. 3(A).

The high-pass filter 20 may be omitted depending on the frequency characteristics of the signal wave processing unit 9. For instance, a second order differentiating circuit also having a high-pass function with a cut-off frequency of about 3 MHz may be used for eliminating the high-pass filter 20.

In all of the above-described cases, a chrominance signal not containing any luminance signal component can be obtained from the output terminal 8, and a waveform correcting signal for the luminance signal, which is thereafter added with the preshoot and the overshoot, can be obtained from a gain control device 15 provided at the output side of the comb-shaped filter 10. Thus, the same object and advantage as described with reference to FIG. 1 can be achieved by the simple and low cost circuit construction shown in FIG. 9.

Figure 10:
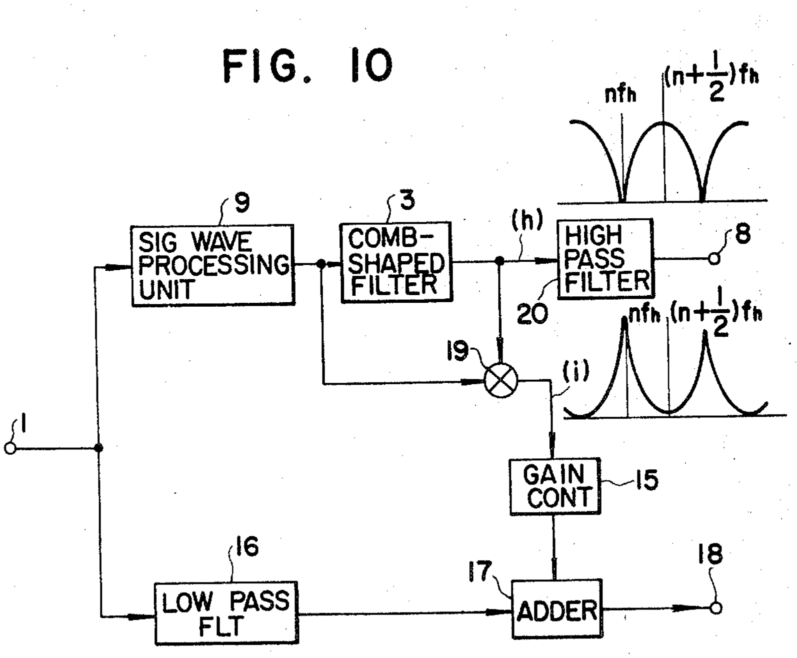

In FIG. 10 there is indicated still another example of the video signal processing device according to the present invention, wherein parts similar to those indicated in FIGS. 1 through 9 are designated by like reference numerals.

In this example, the circuit is so composed that the output of a signal wave processing unit 9 is applied to the output terminal 8 through a comb-shaped filter 3 for passing the chrominance signal and a high-pass filter 20, and on the other hand, the output of the signal wave processing unit 9 and the output of the comb-shaped filter 3 are applied to a subtractor 19 with the output thereof further applied to a gain controller 15.

The output of the comb-shaped filter 3 exhibits a frequency characteristic as shown in FIG. 10 at (*h*), and the output of the subtractor 19 has a frequency characteristic as shown in FIG. 10 at (*i*). In view of the frequency characteristics, it will be preferable to use the example of FIG. 9 when the S/N ratio in the chrominance signal is desired to be improved, and to use the example shown in FIG. 10 when the S/N ratio in the luminance signal is desired to be improved.

Figure 11:
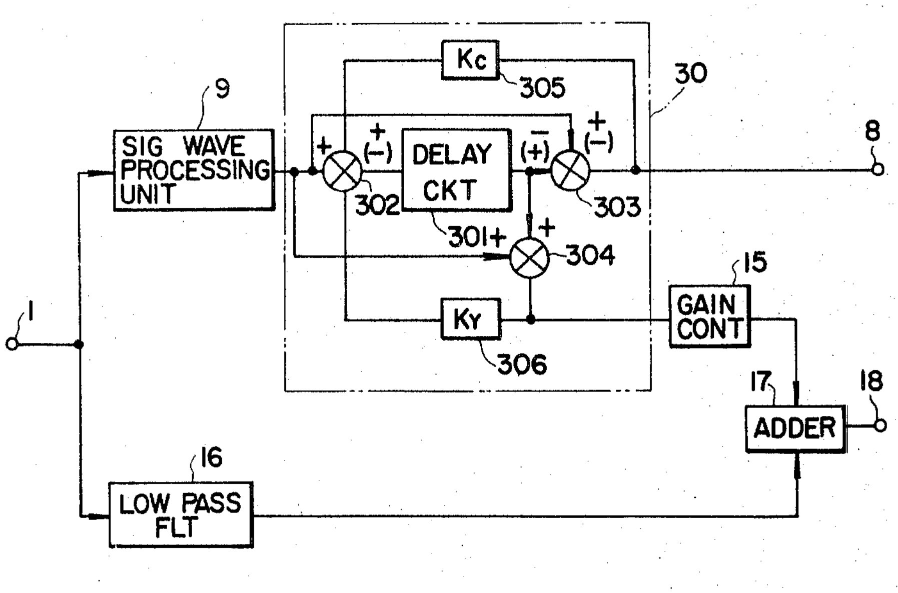

In FIG. 11 there is indicated still another example of the video signal processing device according to the present invention, wherein a single comb-shaped filter including a delay circuit is employed commonly for operating as a comb-shaped filter 3 for passing the chrominance signal and as a comb-shaped filter 10 for passing the luminance signal. In the drawing, the single comb-shaped filter is designated by a reference numeral 30 which comprises a delay circuit 301, an adder (or subtractor) 302, another subtractor 303, another adder 304, and feedback circuits 305 and 306 having feedback ratios $K_c$ and $K_y$ ($1 > K_c > -1$, $1 > K_y > -1$), respectively.

With the above-described circuit components, an operational function passing the chrominance signal is achieved by the adder 302, subtractor 303, delay circuit 301, and the feedback circuit 305, and the other functions passing the luminance signal is achieved by the adders 302 and 304, the delay circuit 301, and the feedback circuit 306.

With the construction of the device as shown in FIG. 11, transfer functions for these two kinds of operational circuits are expressed as follows.

For the chrominance signal passing operation:

$$e_{oc}/e_{in} = G\,(jw)_c = 1 - (1 + 2K_y)\,e^{-jwT_H}/1 - (K_y - K_c)\,e^{-jwT_H} \quad (3)$$

For the luminance signal passing operation:

$$e_{oy}/e_{in} = G\,(jw)_y = 1 + (1 + 2K_c)\,e^{-jwT_H}/1 + (K_c - K_y)\,e^{-jwT_H} \quad (4)$$

In these equations, when the feedback ratios $K_c$ and $K_y$ are both assumed to be zero, the following relations can be obtained.

$$G\,(jw)_c = 1 - e^{-jwT_H} \quad (5)$$

$$G\,(jw)_y = 1 + e^{-jwT_H} \quad (6)$$

These relations are quite similar to the relations obtained from the transfer functions (1) and (2) for the comb-shaped filters shown in FIG. 1 under the assumption of the feedback ratios $K_c$ and $K_y$ being zero. This fact indicates that the operational characteristics in the two kinds of functions of the device shown in FIG. 11 are quite equivalent to those shown in FIG. 1 under the conditions of the feedback ratios $K_c$ and $K_y$ being zero. Thus, the same extent of advantageous effects for improving the picture quality can be obtained for both of the examples shown in FIGS. 1 and 11. This means that the unification of the delay circuit is possible.

However, in the construction shown in FIG. 11, if the feedback ratios $K_c$ and $K_y$ are increased more than zero for improving the picture quality, $K_c$ and $K_y$ are not eliminated in the equations (3) and (4). This means that the fedback signals in both of the circuits interfere with each other. Thus, the frequency characteristic of one filter operation, inclusive of the infinite attenuation points, is varied by the feedback ratio of the other filter operation, and the advantageous feature of eliminating the "dot" interference and the "cross color" interference is remarkably degraded. When the values of the feedback ratios $K_c$ and $K_y$ are not adequate, the picture quality is substantially deteriorated, and the advantageous effect such as obtained in the device shown in FIG. 1 at such values of $K_c$ and $K_y$ cannot be obtained anymore.

Figure 12:
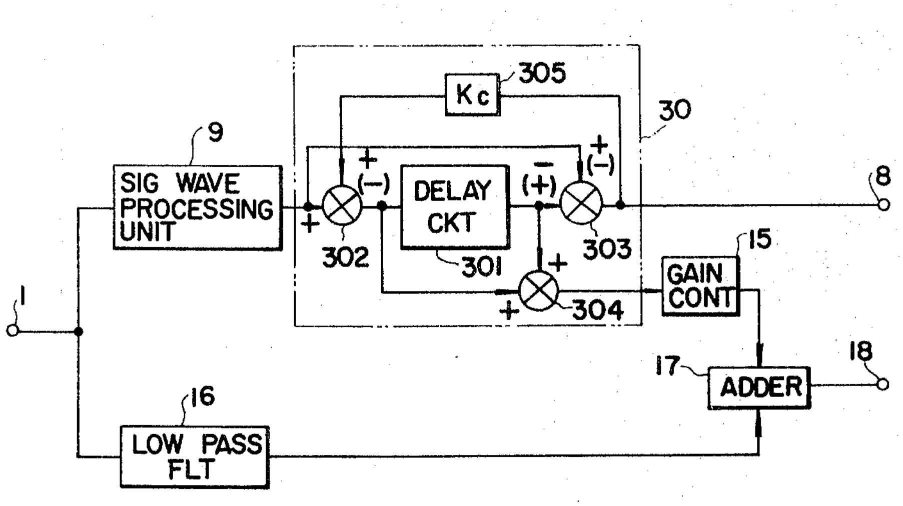

An example of the device shown in FIG. 12 is presented for overcoming the above-described drawbacks of the example shown in FIG. 11. In this example, a single comb-shaped filter is commonly used for passing the chrominance signal and the luminance signal with the least interference between both of the feedback circuits. With this construction, the "dot" interference and the "cross color" interference can be eliminated with the simultaneous improvement of the S/N ratio and the resolution of the images.

In the device shown in FIG. 12, a comb-shaped filter for passing the chrominance signal is composed of an adder 302 (also operable as a subtractor), a subtractor 303, a delay circuit 301 having a delay time equivalent to one horizontal scanning period, and a feedback circuit 305.

As far as this filter is concerned, it is quite similar to the filter in FIG. 1, and the transfer function thereof can be expressed as $$e_{oc}/e_{in} = G(jw)_c = 1 - e^{-jwT_H} /1 + K_c\, e^{-jwT_H} \quad (7)$$

It is apparent that this filter is not influenced by the circuit passing the luminance signal. When the equation (7) is normalized at the maximum gain of $2/(1 - K_c)$ under the assumption of $f = (n + ½)\, f_H$ and $e^{-jwT_H} = -1$, the frequency characteristic is varied by the variation of the feedback ratio $K_c$ as shown at *a*, *b*, and *c* in FIG. 14(A). The curve *a* corresponds to $K_c = 0$, the curve *b* corresponds to $K_c = -0.5$, and the curve *c* corresponds to $K_c = 0.5$.

The chrominance signal containing high frequency components of the luminance signal, constituting the output signal of the signal wave processing unit 9, is thus passed through the filter 30, and the high-frequency components of the luminance signal concentrated near the higher harmonics n $f_H$ of the horizontal synchronizing frequency $f_H$ are suppressed as was explained in FIG. 1. For this reason, a chrominance signal causing no "cross color" interference can be obtained from the terminal 8, and the advantages feature can be further improved by varying the filter characteristic in accordance with $K_c$ and also by improving the S/N ratio to the extent of 10 Log $2/(1 - K_c)$ dB ($-1 < K_c < 1$).

On the other hand, a filter circuit for passing the luminance signal is made of an adder 302, a delay circuit 301, a subtractor 303, and an adder 304. A signal obtained from the adder 302 and the same signal passed through the delay circuit 31 are added together in the adder 304 with polarity signs as indicated in FIG. 12. With this construction, the output signal $e_{oc}$ of the previously described comb-shaped filter for passing the chrominance signal has been fedback through the hereinbefore described feedback circuit 305 to the adder 302, and in the adder 304, a signal delayed by one horizontal scanning period through the delaying circuit 301 and another signal not delayed are added together. In this case, the frequency components of $(n + ½)\, f_H$, in which greater energy of the chrominance signal frequencies are distributed, are shifted in their phases by 180° within the delay circuit 301 and canceled in the adder 304 by the frequency components which are not shifted. For this reason, such components of the chrominance signal do not appear in the output signal from the adder 304. Furthermore, within the fedback signals through the feedback circuit 305, those frequency components $n\, f_H$ in which greater energy of the luminance signal frequencies are distributed have been beforehand attenuated infinitely in the comb-shaped filter for passing the chrominance signal. Thus, the characteristic of the filter for passing the luminance signal is not varied at the frequencies of $(n + ½)\, f_H$ and $n\, f_H$ even in the case where the feedback ratio $K_c$ varies. However, the characteristic of the filter is slightly varied for the frequencies between the $n\, f_H$ and the $(n + ½)\, f_H$.

The transfer function for the filter circuit for passing the luminance signal, also having a comb-shaped attenuation characteristic can be expressed as follows:

$$e_{oy}/e_{in} = G(jw)_y = (1 + K_c)\,(1 + e^{-jwT_H})/1 + K_c\, e^{-jwT_H} \quad (8)$$

As will be apparent from the equation, the value is varied by the feedback ratio $K_c$. However, in the equation (8), when $f = n\, f_H$, $e^{-jwT_H} = 1$, and $G(jw)_y = 2$ are obtained, and when $f = (n + ½)\, f_H$, $e^{-jwT_H} = -1$, and $G(jw)_y = 0$ are obtained. For this reason, a constant value of $G(jw)_y = 2$ is obtained for any value of the feedback ratio $K_c$ when the operational frequency coincides with the luminance signal frequencies $n\, f_H$, and $G(jw)_y = 0$ is obtained for any value of the feedback ratio $K_c$ when the operational frequency coincides with the chrominance frequencies $(n + ½)\, f_H$.

Figure 14A:
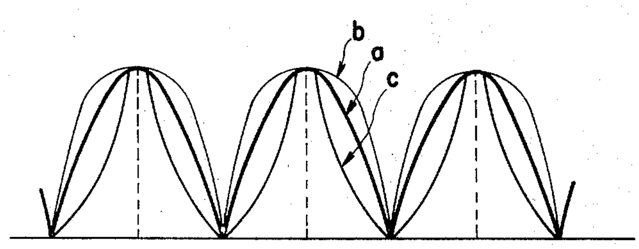
FIGS. 14(A) and 14(B) are diagrams showing frequency characteristics of the embodiments shown in FIGS. 12 and 13.
Figure 14B:
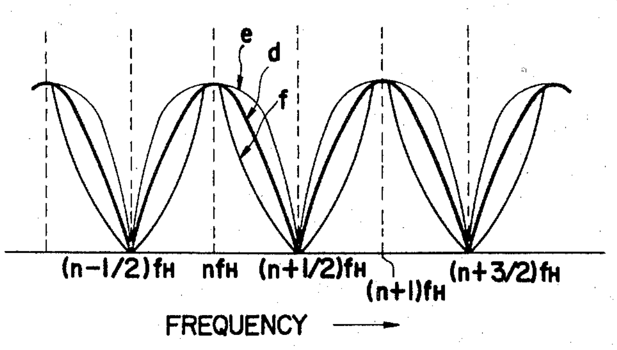

As described before, the value of $G(jw)_y$ is varied by the feedback ratio $K_c$ for the frequencies intermediate between $n\, f_H$ and $(n + ½)\, f_H$, whereby the frequency characteristic of this filter circuit is represented by the curves *d*, *e* and *f* in FIG. 14(B). As a result, the luminance signal wherein the frequency components of the chrominance signal are sufficiently suppressed can be obtained from the adder 304, and the variation thereof copending on the variation of the feedback ratio $K_c$ can be neglected. Herein, the curve *d* corresponds to $K_c = 0$, the curve *e* corresponds to $K_c = 0.5$, and the curve *f* corresponds to $K_c = -0.5$.

From the characteristics shown in FIGS. 14(A) and 14(B), it will be apparent that a chrominance signal wherein high-frequency components of the luminance signal and random noise are suppressed can be obtained from the terminal 8, and a luminance signal wherein the chrominance signal components and random noise are suppressed can be obtained from the adder 304. The output of the adder 304 is then regulated as to its level in a level controller 15 and is added with an output signal from a lowpass filter 16 in an adder 17. The output of the adder 17 is delivered from an output terminal 18. Since the output luminance signal obtained from the terminal 18 is substantially free from the chrominance signal components and random noise, "dot" interference is thereby substantially eliminated and the resulution of the image can be improved remarkably.

Furthermore, the S/N ratio in the chrominance channel can be maintained in the conventional level of 10 Log $2/(1 - K_c)$ dB by varying the feedback ratio $K_c$ suitably, and no malfunctioning effect is thereby produced on the luminance channel. When the S/N ratio in the luminance channel is desired to be further improved, the polarity of the feedback ratio $K_c$ is selected to be negative, and when the S/N ratio in the chrominance channel is desired to be improved, the polarity of the $K_c$ is selected to be positive. Thus, by employing only one feedback circuit, two kinds of comb-shaped filter circuits can be formed, and the characteristics of these filter circuits can be varied as desired by varying the feedback ratio $K_c$ of the single feedback circuit. However, since it has been found that any greater value of $K_c$ than +0.5 causes blur of the chrominance signal in the vertical direction thereof on the picture plane, and any less value of $K_c$ than −0.5 causes remarkable reduction in the resolution along the vertical direction of the luminance signal, the feedback ratio $K_c$ must be selected within the range of $-0.5 \leqq K_c \leqq +0.5$.

Figure 13:
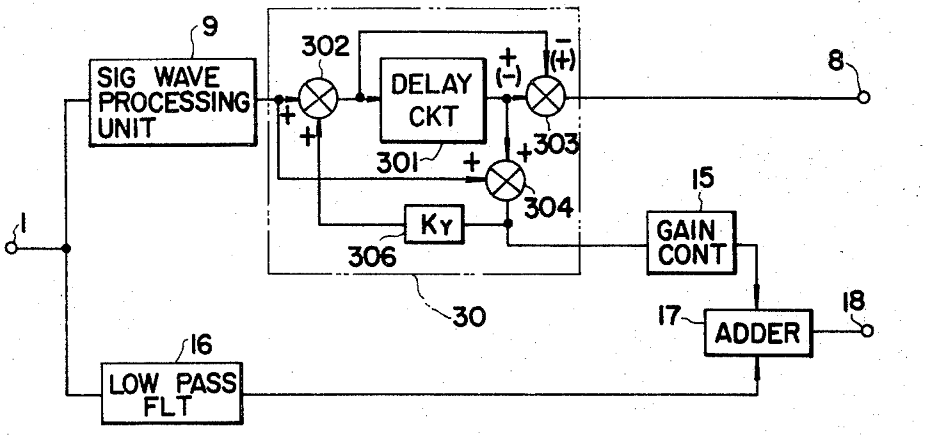

In FIG. 13 there is illustrated still another example of a video signal processing device according to the present invention, the fundamental concept of which is similar to the example of FIG. 12. In this example, however, the feedback circuit is placed on the side of the comb-shaped filter passing the luminance signal, which is formed of adders 302 and 304, a delay circuit 301, and a feedback circuit 306. Likewise, the comb-shaped filter for passing the chrominance signal is formed by the adders 302 and 304, a subtractor 303, a delay circuit 301, and the feedback circuit 306.

The transfer functions for these comb-shaped filters are as follows:

$$e_{oy}/e_{in} = G(jw)_y = 1 + e^{-jwT_H} / 1 - K_y\, e^{-jwT_H} \quad (9)$$

$$e_{oc}/e_{in} = G(jw)_c = (1 + K_y)\,(1 - e^{-jwT_H})/1 - K_y\, e^{-jwT_H} \quad (10)$$

The frequency characteristics of the filters can be obtained by normalizing the functions at their maximum gains $2/(1 - K)$ and 2, respectively. The characteristics thus obtained are indicated in FIGS. 14(A) and 14(B), respectively. The curves *a*, *b*, and *c* in FIG. 14(A) correspond to the cases of $K_c = 0$, $K_c = 0.5$, and $K_c = -0.5$, and the curves *d*, *e*, and *f* in FIG. 14(B) correspond to the cases of $K_y = 0$, $K_y = -0.5$, and $K_y = 0.5$.

In the above-described example, two kinds of comb-shaped filters for separating the chrominance signal and the luminance signal can be formed by the use of a single delay circuit, and the characteristics of these filters can be varied suitably by varying the feedback ratio of the feedback circuit. For this reason, the "cross color" interference, "dot" interference, and the like can be effectively eliminated from the picture, and S/N ratio and the resolution of the image can be remarkably improved.

What is claimed is:

1. A video signal processing device for a color television receiver comprising:

1. a band-pass filter for extracting high-frequency components from a composite video signal including a chrominance signal and a luminance signal and formed in such a manner that the chrominance signal exists in a frequency interleaving relation in the high-frequency range of the luminance signal;
2. a low-pass filter for extracting low-frequency components from said composite video signal;
3. a signal wave processing unit for processing the waveform of said composite video signal for the purpose of obtaining a preshoot and an overshoot to be applied on the output signal from said low-pass filter;
4. filter circuit means including a first comb-shaped filter connected to the output of said band-pass filter for extracting the chrominance signal components from the output of said band-pass filter and a second comb-shaped filter connected to the output of said signal wave processing unit for extracting the luminance signal components from the output of said signal wave processing unit;
5. a gain controller for regulating the output level of the luminance signal components extracted through said filter circuit means; and
6. an adder for adding the output of said low-pass filter and the output of said gain controller;

whereby a low noise chrominance signal is obtained from said comb-shaped filter circuit means, and a luminance signal of low noise and rendered with a preshoot and an overshoot both adjustable to desired levels is obtained from said adder.

2. A video signal processing device for a color television receiver as set forth in claim 1 wherein:

said first comb-shaped filter has maximum attenuating points at the horizontal synchronizing frequency $f_H$ of said composite video signal and its higher harmonic frequencies $n\, f_H$ where $n$ is a positive integer, and said second comb-shaped filter has maximum attenuation points at frequencies $(n + ½)\, f_H$.

3. A video signal processing device as set forth in claim 1 wherein:

said first comb-shaped filter comprises a delay circuit for delaying the input signal for a period of $T_H$ where $T_H$ designates one horizontal scanning period and a subtractor for subtracting either one of the output from the delay circuit and the input signal to said delay circuit from the other.

4. A video signal processing device as set forth in claim 3 wherein said first comb-shaped filter is further provided with a feedback circuit to feedback the output of said subtractor to the input side of the delay circuit, whereby the frequency characteristic of the comb-shaped filter can be varied by varying the feedback ratio of said feedback circuit.

5. A video signal processing device as set forth in claim 1 wherein said second comb-shaped filter comprises a delay circuit for delaying the input signal applied thereto for a period of $T_H$ where $T_H$ is one horizontal scanning period and an adder for adding the output from the delay circuit to said input signal of said comb-shaped filter.

6. A video signal processing device as set forth in claim 5 wherein said second comb-shaped filter is further provided with a feedback circuit to feedback the output of said adder to the input side of said delay circuit, whereby the frequency characteristic of said comb-shaped filter can be varied by varying the feedback ratio of said feedback circuit.

7. A video signal processing device as set forth in claim 1 wherein said signal wave processing unit is provided in the form of a second order differentiating circuit.

8. A video signal processing device for a color television receiver comprising:

1. a low-pass filter for extracting low-frequency components from a composite video signal including a chrominance signal and a luminance signal and formed in such a manner that the chrominance signal exists in a frequency interleaving relation in the high-frequency range of the luminance signal;
2. a signal wave processing unit for processing the waveform of said composite video signal for obtaining a preshoot and an overshoot to be applied on the output signal from said low-pass filter;
3. filter circuit means including a comb-shaped filter for extracting the chrominance signal components and the luminance signal components from the output of said signal wave processing unit;
4. a gain controller for regulating the output level of the luminance signal components extracted through said filter circuit means; and
5. an adder for adding the output of said low-pass filter and the output of said gain controller;

whereby a low noise chrominance signal is obtained from said filter circuit means, and a luminance signal of low noise and rendered with a preshoot and an overshoot both being adjustable to desired levels is obtained from said adder.

9. A video signal processing device as set forth in claim 8 wherein said filter circuit means comprises a comb-shaped filter having maximum attenuating points at frequencies $(n + \frac{1}{2})\, f_H$ thereby to extract the luminance signal components from the input signal applied thereto, and a subtractor for subtracting the output of said comb-shaped filter from said input signal.

10. A video signal processing device as set forth in claim 8 wherein said filter circuit means comprises a comb-shaped filter having maximum attenuating points at frequencies $n\, f_H$ thereby to extract the chrominance signal components from the input signal, and a subtractor for subtracting the output of said comb-shaped filter from said input signal.

11. A video signal processing device as set forth in claim 9 wherein said comb-shaped filter comprises a delay circuit for delaying the input signal for a period of $T_H$, where $T_H$ is one horizontal scanning period, and an adder for adding the output of said delay circuit to said input signal.

12. A video signal processing device as set forth in claim 11 wherein said comb-shaped filter is further provided with a feedback circuit for feeding the output of said adder back to the input side of said delay circuit whereby the frequency characteristic of said comb-shaped filter can be varied by varying the feedback ratio of said feedback circuit.

13. A video signal processing device as set forth in claim 10 wherein said comb-shaped filter comprises a delay circuit for delaying the input signal for a period of $T_H$, where $T_H$ is one horizontal scanning period, and a subtractor for subtracting either one of said input signal and the output of said delay circuit from the other.

14. A video signal processing device as set forth in claim 13 wherein said comb-shaped filter is further provided with a feedback circuit to feed the output of the subtractor back to the input side of said delay circuit whereby the frequency characteristic of said comb-shaped filter can be varied by varying the feedback ratio of said feedback circuit.

15. A video signal processing device as set forth in claim 8 wherein said filter circuit means comprises:

1. delay means for delaying an input signal for a period of $T_H$, where $T_H$ is one horizontal scanning period;
2. a subtractor for subtracting either one of the input signal and output signal for said delay means from the other of the same thereby to extract the chrominance signal components;
3. a first adder for adding the output of said signal wave processing unit and the output of said delay means for obtaining the luminance signal components;
4. a feedback circuit for feeding the output of said first adder back to the input side of said delay means;
5. a second adder for adding the output of said feedback circuit and the output of said signal wave processing unit for applying the thus obtained output to said delay means.

16. A video signal processing device as set forth in claim 8 wherein said filter circuit means comprises:

1. delay means for delaying the input signal for a period of $T_H$, where $T_H$ is one horizontal scanning period;
2. a subtractor for subtracting the output of said delay means from the output of said signal wave processing unit for obtaining the chrominance signal components;
3. a first adder for adding the input and the output of said delay means for obtaining the luminance signal components;
4. a feedback circuit to feed the output of said subtractor back to the input side of said delay means; and
5. a second adder for adding the output of said feedback circuit and the output of said signal wave processing unit for applying the thus added output signal to said delay means.

17. A video signal processing device as set forth in claim 8 wherein said filter circuit means comprises:

1. delay means for delaying the input signal for a period of $T_H$, where $T_H$ is one horizontal scanning period;
2. a first subtractor for subtracting the output of said signal wave processing unit from the output of said delay means for obtaining the chrominance signal components;
3. an adder for adding the input and the output of said delay means for obtaining the luminance signal components;

4. a feedback circuit for feeding the output of said subtractor back to the input side of said delay means; and
5. a second subtractor for subtracting the output of said feedback circuit from the output of said signal wave processing unit.

18. A video signal processing device for a color television receiver comprising:
1. a low-pass filter connected to receive a composite video signal for extracting low-frequency components therefrom, said composite video signal including a chrominance signal and a luminance signal formed in such a manner that the chrominance signal exists in a frequency interleaving relation in the high-frequency range of the luminance signal;
2. a signal wave processing unit connected to receive the composite video signal for processing the waveform thereof to obtain a preshoot and an overshoot to be applied on the output signal from said low-pass filter;
3. a single comb-shaped filter connected to the output of the signal wave processing unit for extracting the luminance signal components therefrom;
4. a subtractor for subtracting the output of said comb-shaped filter from the output of said signal wave processing unit;
5. a gain controller for regulating the output level of the luminance signal components extracted through said comb-shaped filter; and
6. an adder for adding the output of said low-pass filter and the output of said gain controller;

whereby a low noise chrominance signal is obtained from said subtractor and a luminance signal of low noise provided with a preshoot and an overshoot both being adjustable to desired levels is obtained from said adder.

19. A video signal processing device as set forth in claim 18 wherein said filter circuit means comprises a comb-shaped filter having maximum attenuating points at frequencies $(n + 1/2)\ f_H$ thereby to extract the luminance signal components from the input signal applied thereto, and a subtractor for subtracting the output of said comb-shaped filter from said input signal.

20. A video signal processing device as set forth in claim 19 wherein said comb-shaped filter comprises a delay circuit for delaying the input signal for a period of $T_H$, where $T_H$ is one horizontal scanning period, and an adder for adding the output of said delay circuit to said input signal.

21. A video signal processing device as set forth in claim 20 wherein said comb-shaped filter is further provided with a feedback circuit for feeding the output of said adder back to the input side of said delay circuit whereby the frequency characteristic of said comb-shaped filter can be varied by varying the feedback ratio of said feedback circuit.

22. A video signal processing device for a color television receiver comprising:
1. a low-pass filter connected to receive a composite video signal for extracting low-frequency components therefrom, said composite video signal including a chrominance signal and a luminance signal in such a manner that the chrominance signal exists in a frequency interleaving relation in the high-frequency range of the luminance signal;
2. a signal wave processing unit connected to receive the composite video signal for processing the waveform thereof to obtain a preshoot and an overshoot to be applied on the output signal from said low-pass filter;
3. a single comb-shaped filter connected to the output of the signal wave processing unit for extracting the chrominance signal components therefrom;
4. a subtractor for subtracting the output of said comb-shaped filter from the output of said signal wave processing unit;
5. a gain controller for regulating the output level of the luminance signal components extracted through said subtractor; and
6. an adder for adding the output of said low-pass filter and the output of said gain controller;

whereby a low noise chrominance signal is obtained from said comb-shaped filter and a luminance signal of low noise and rendered with a preshoot and an overshoot both being adjustable to desired levels is obtained from said adder.

23. A video signal processing device as set forth in claim 22 wherein said filter circuit means comprises a comb-shaped filter having maximum attenuating points at frequencies $n\ f_H$ thereby to extract the chrominance signal components from the input signal, and a subtractor for subtracting the output of said comb-shaped filter from said input signal.

24. A video signal processing device as set forth in claim 23 wherein said comb-shaped filter comprises a delay circuit for delaying the input signal for a period of $T_H$, where $T_H$ is one horizontal scanning period, and a subtractor for subtracting either one of said input signal and the output of said delay circuit from the other.

25. A video signal processing device as set forth in claim 24 wherein said comb-shaped filter is further provided with a feedback circuit to feed the output of the subtractor back to the input side of said delay circuit whereby the frequency characteristic of said comb-shaped filter can be varied by varying the feedback ratio of said feedback circuit.

* * * * *